United States Patent
Lee et al.

(10) Patent No.: US 7,012,955 B2
(45) Date of Patent: Mar. 14, 2006

(54) METHOD AND APPARATUS FOR DIRECT SEQUENCE SPREAD SPECTRUM RECEIVER USING AN ADAPTIVE CHANNEL ESTIMATOR

(75) Inventors: Yong-Hwan Lee, Seoul (KR); Ji-Woong Choi, Seoul (KR)

(73) Assignee: Samsung Electronics Co., Ltd., (KR)

( * ) Notice: Subject to any disclaimer, the term of this patent is extended or adjusted under 35 U.S.C. 154(b) by 785 days.

(21) Appl. No.: 09/793,241

(22) Filed: Feb. 26, 2001

(65) Prior Publication Data

US 2002/0021749 A1 Feb. 21, 2002

(30) Foreign Application Priority Data

Jul. 10, 2000 (KR) ............... 2000-39225

(51) Int. Cl.
*H04B 17/00* (2006.01)
*H04B 3/46* (2006.01)
*H04Q 1/20* (2006.01)

(52) U.S. Cl. .............. 375/224; 375/150; 375/224

(58) Field of Classification Search ............... 375/224, 375/316, 340, 325, 346, 348, 350, 130, 144, 375/148, 147, 142, 150

See application file for complete search history.

(56) References Cited

U.S. PATENT DOCUMENTS

| 5,303,269 | A | * | 4/1994 | Altes | 375/322 |
|---|---|---|---|---|---|
| 5,651,030 | A | * | 7/1997 | Wong et al. | 375/316 |
| 6,134,262 | A | * | 10/2000 | Kitade et al. | 375/142 |
| 6,240,282 | B1 | * | 5/2001 | Kleider et al. | 455/226.1 |
| 6,243,410 | B1 | * | 6/2001 | LaRosa et al. | 375/148 |
| 6,430,214 | B1 | * | 8/2002 | Jalloul et al. | 375/147 |
| 6,442,193 | B1 | * | 8/2002 | Hirsch | 375/147 |
| 6,493,329 | B1 | * | 12/2002 | Leung | 370/335 |
| 6,658,047 | B1 | * | 12/2003 | Komulainen et al. | 375/150 |
| 6,700,919 | B1 | * | 3/2004 | Papasakellariou | 375/130 |
| 6,708,146 | B1 | * | 3/2004 | Sewall et al. | 704/217 |
| 2001/0036812 | A1 | * | 11/2001 | Engstrom | 455/63 |
| 2001/0048724 | A1 | * | 12/2001 | Subramanian | 375/322 |
| 2003/0210667 | A1 | * | 11/2003 | Zhengdi | 370/335 |

\* cited by examiner

*Primary Examiner*—Jean B. Corrielus
(74) *Attorney, Agent, or Firm*—Dilworth & Barrese LLP

(57) ABSTRACT

The present invention is about a method and apparatus for direct sequence spread spectrum (DS/SS) system receivers that employ a channel estimator for coherent demodulation. The proposed DS/SS receiver is composed of the channel estimation controller (CEC), the channel parameter estimator (CPE), the channel estimation filter (CEF) module and the demodulator module. The proposed scheme estimates the channel environment when the pilot signal is transmitted in parallel with the message signal for coherent detection. The internal parameters of the CPE and the CEF are determined by the CEC according to the operating conditions. The CPE adaptively controls the bandwidth of the CEF by classifying the channel type from the received pilot signal. Thus, the proposed scheme can obtain improved channel information, providing the enhancement of the receiver performance. This enhancement can provide the improvement of the link performance, the service time and/or the user capacity.

9 Claims, 6 Drawing Sheets

METHOD AND APPARATUS FOR DIRECT SEQUENCE SPREAD SPECTRUM RECEIVER USING AN ADAPTIVE CHANNEL ESTIMATOR

BACKGROUND OF THE INVENTION

The transmitter of a direct sequence spread spectrum (DS/SS) system spreads narrowband message signals into wideband signals using the spreading sequences. The receiver detects the desired signal by multiplying the received signal with the spreading sequences synchronized to that of the transmitter is disclosed in J. G. Proakis, *Digital communications*, McGraw-Hill, 3rd edition, 1995. To receive the signal, coherent receiver scheme needs the phase information of the received signal, providing better reception performance than noncoherent one at the expense of increased complexity. In particular, coherent detection in a rake receiver requires channel information including the amplitude and the phase of the channel. The channel information can be estimated using a pilot signal transmitted with the message signal. An example is disclosed in F. Ling, "Coherent detection with reference symbol based channel estimation for direct sequence CDMA uplink communications," *IEEE Proc. VTC '93*, pp. 400–403, May 1993.

The accuracy of channel estimation can be improved by reducing the noise effect contained in the obtained channel information, which is usually achieved by employing a lowpass filter, called the channel estimation filter (CEF). The performance of channel estimation is significantly affected by the CEF and the channel condition, including the maximum Doppler frequency and fading characteristics. In general, commercial CDMA receivers employ conventional CEF with fixed parameters (e.g., the cut-off bandwidth).

A DS/SS receiver employing an adaptive channel estimator was proposed in Kitade et al., *Spread spectrum receiving apparatus*, U.S. Pat. No. 6,134,262, 2000, where the CEF is changed based on the maximum Doppler frequency. The maximum Doppler frequency was estimated by measuring how many times the received signal power exceeds a predetermined threshold. However, the scheme in said Kitade et al., *Spread spectrum receiving apparatus*, U.S. Pat. No. 6,134,262, 2000, may not be practical when the transmitted signal is fast power controlled for compensating fast fading as well as the near-far effect, because the power of the received signal cannot fully reflect the fading statistics of the channel.

BRIEF SUMMARY OF THE INVENTION

The present invention is about a method and apparatus for reception of DS/SS signals that improves the receiver performance by enhancing the accuracy of the estimated channel information using an adaptive channel estimator.

The channel estimator may behave differently depending upon the channel environment. The parameters of a conventional CEF are designed for a fixed, particular channel condition. As a result, the performance of the channel estimator employing a CEF with fixed parameters can be degraded when the channel condition becomes different from one assumed for the design of the CEF. It can be expected that improved channel estimation can be obtained if the parameters of the CEF are adaptively adjusted according to the channel environment. The operating condition can be estimated using the received pilot signal. Although the scheme in said Kitade et al., *Spread spectrum receiving apparatus*, U.S. Pat. No. 6,134,262, 2000 considers only the maximum Doppler frequency, the present invention considers the fading statistics, the number of multipaths and the received signal power as well as the maximum Doppler frequency. This enables the present invention to provide improved channel estimation performance regardless of the employment of fast power control. As a result, the present invention can improve the system performance, making it possible to improve the link performance, the user capacity and/or the service time.

DETAILED DESCRIPTION OF THE INVENTION

Figure 1:
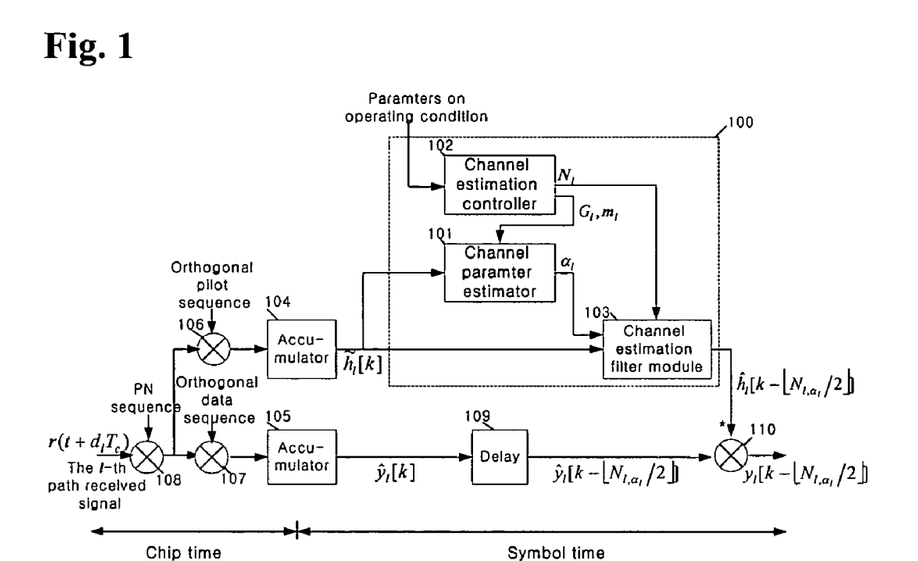
FIG. 1 is the l-th finger of a proposed DS/SS receiver using an adaptive channel stimator.

FIG. 1 depicts the ι-th finger of the proposed DS/SS receiver employing an adaptive channel estimator. The proposed DS/SS receiver is composed of the channel estimation controller (CEC) 102, the channel parameter estimator (CPE) 101, the channel estimation filter (CEF) module 103 and the demodulator module. The CEC 102 determines the internal parameters of the CPE 101 and the CEF module 103 considering the characteristics of operating condition. The CPE 101 classifies the channel type using the received pilot signal and selects a CEF appropriate to the estimated channel type. The received signal is despread using a spreading sequence synchronized with that of transmitter at each finger and then combined using the channel gain obtained by the CEF in the demodulator module.

The received signal $r(t+d_1 T_c)$ of the ι-th path is despread by the multiplier 108 that multiplies an appropriate PN sequence synchronized with that of the transmitter. The multiplier 106 separates the pilot signal from the data signal by multiplying the input signal with orthogonal pilot sequence. The accumulator 104 accumulates the pilot signal for an amount of samples equal to the spreading factor to obtain the pilot symbol $ĥ_l[k]$. Similarly, data symbol $ŷ_l[k]$ is generated using the orthogonal data sequence.

Figure 8:
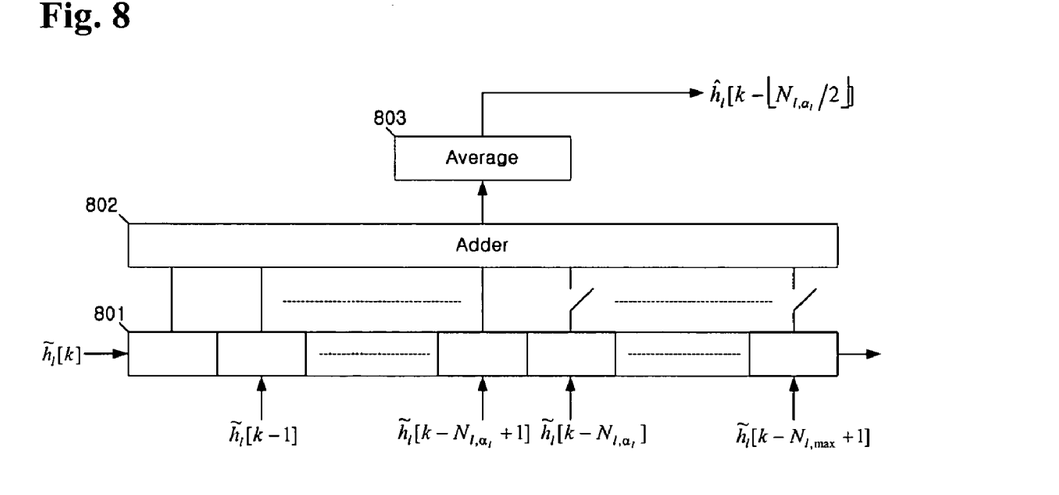
FIG. 8 represents a CEF employing a moving average (MA) FIR filter.
Figure 9:
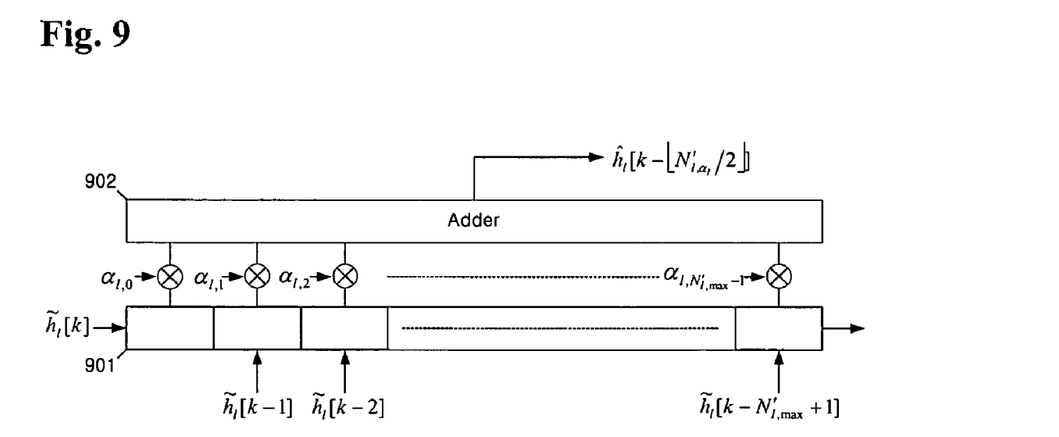
FIG. 9 represents a CEF employing a general FIR filter.
Figure 10:
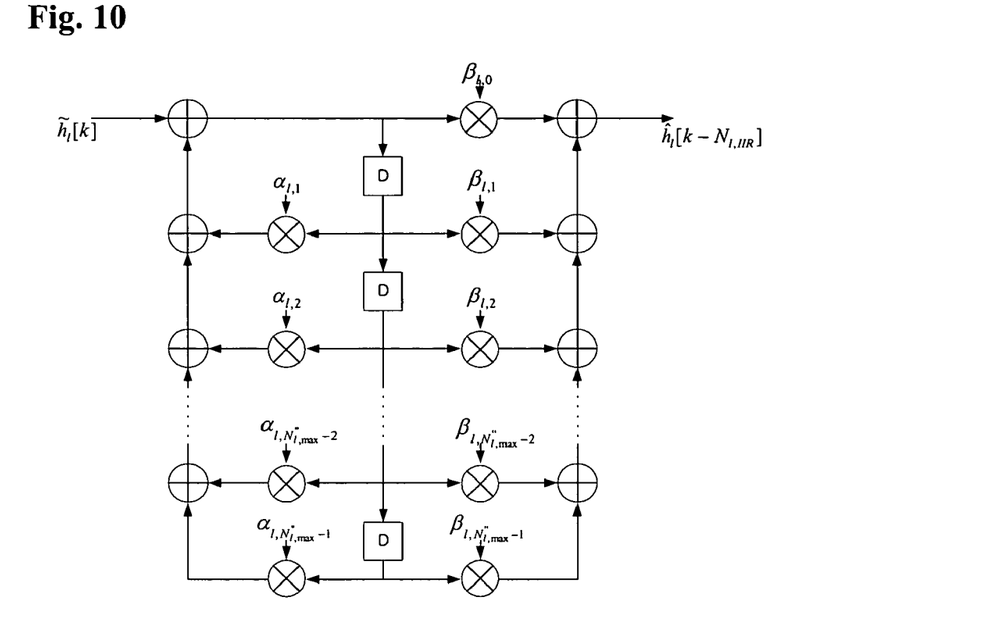
FIG. 10 represents a CEF employing a general IIR filter.
Figure 11:
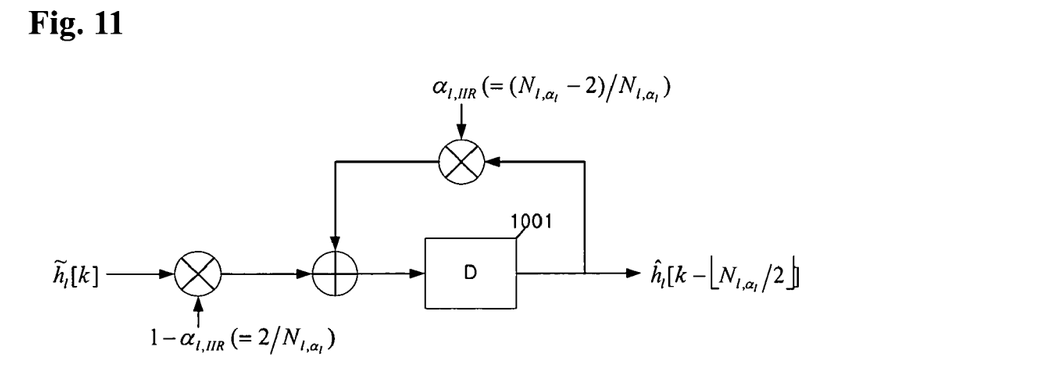
FIG. 11 represents a CEF employing a single-pole IIR filter.

The channel estimator 100 provides the channel information for combining the rake receiver outputs. The CEC 102 generates the control signals that initialize the internal parameters of the CPE 101 and the CEF module 103 considering the channel environment and operating condition. The CPE 101 provides the CEF module 103 with the channel parameters using the received pilot signals. The parameters of the CEF are determined based on the output of the CPE 101. The CEF can be implemented in the form of a finite impulse response (FIR) filter or infinite impulse response (IIR) filter. For example, if a moving average (MA) type FIR filter is used as the CEF, as shown in FIG. 8, the number of taps can be determined based on the output of CPE 101. When a general type FIR filter is used as the CEF as shown in FIG. 9, the coefficients and the tap size of the CEF is selected among the pre-designed FIR filters considering the output of the CPE 101. If an IIR filter is used as the CEF as shown in FIG. 10, one of pre-designed IIF filters is selected based on the output of CPE 101. As a simple case, a single-pole IIR filter can be used as the CEF as shown in FIG. 11, where the forgetting factor is determined based on the output of CPE 101.

The channel information can be obtained by filtering the pilot symbols $\tilde{h}_l[k]$ using the CEF. The data symbols $\hat{y}_l[k]$ pass through the delay element 109 to compensate the delay due to the channel estimation process. The delayed data symbol is multiplied by the conjugate of the estimated channel gain using the multiplier 110. Finally, all the received data signals from each finger of the rake receiver are combined for decision.

Figure 2:
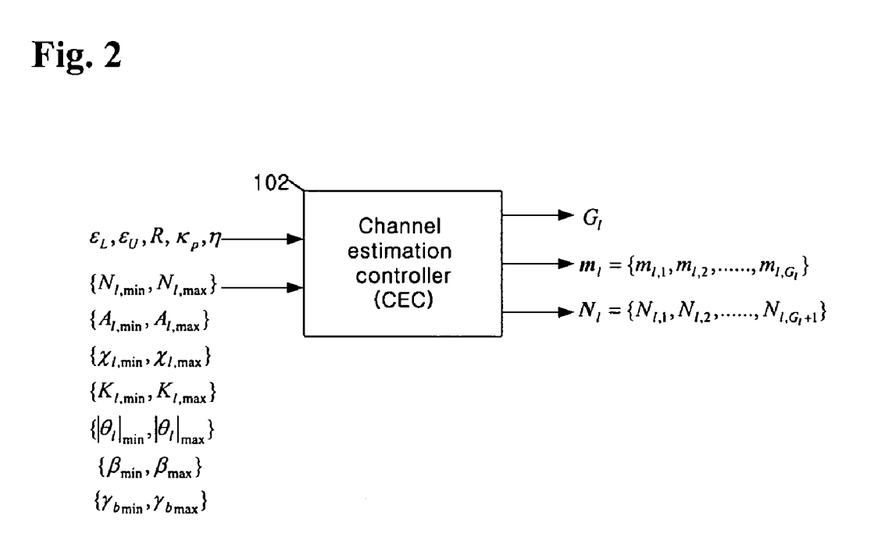
FIG. 2 is the channel estimation controller (CEC) of FIG. 1.

The operation of the proposed adaptive channel estimator is as follows. The CEC 102 in FIG. 1 is redrawn in FIG. 2. The CEC 102 takes norminal operating condition 5 parameters required by the base station or mobile station to provide appropriate services. These parameters for the l-th finger include the minimum and the maximum tap size, $N_{l,min}$ and $N_{l,max}$, the minimum and the maximum values of the ratio of total received power to the receiver power of the l-th path, $A_{l,min}$ and $A_{l,max}$, the minimum and the maximum values of the channel spectrum index, $\chi_{l,min}$ and $\chi_{l,max}$, the minimum and the maximum values of the Ricean factor, $K_{l,min}$ and $K_{l,max}$, the minimum and the maximum values of the incident angle of the direct ray, $|\theta_l|_{min}$ and $|\theta_l|_{max}$, the minimum and the maximum values of the pilot to data signal power ratio, $\beta_{min}$ and $\beta_{max}$, and the minimum and the maximum values of the signal to noise power ratio per bit, $\gamma_{b\,min}$ and $\gamma_{b\,max}$. In addition, the CEC 102 requires the information on the code rate R, the threshold value $\eta$, the noise rejection ratio $\kappa_p$ of the prefilter 501 which means the noise suppression factor equal to the input noise to output noise power ratio of the prefilter, and upper bound and lower bound of the tap margin, $\epsilon_L$ and $\epsilon_U$. This margin is related to the decision of the tap size of the CEF and the correlation interval of the correlator and $0 < \epsilon_L \leq \epsilon_U < 1$, in general. Based on these parameters, the CEC 102 determines the number $G_l$ of correlators 502, the set $m_l$ of the delayed symbols $m_{l,i}$ of the CPE 101, and the set $N_l$ of the CEF tap size $N_{l,i}$.

Figure 3:
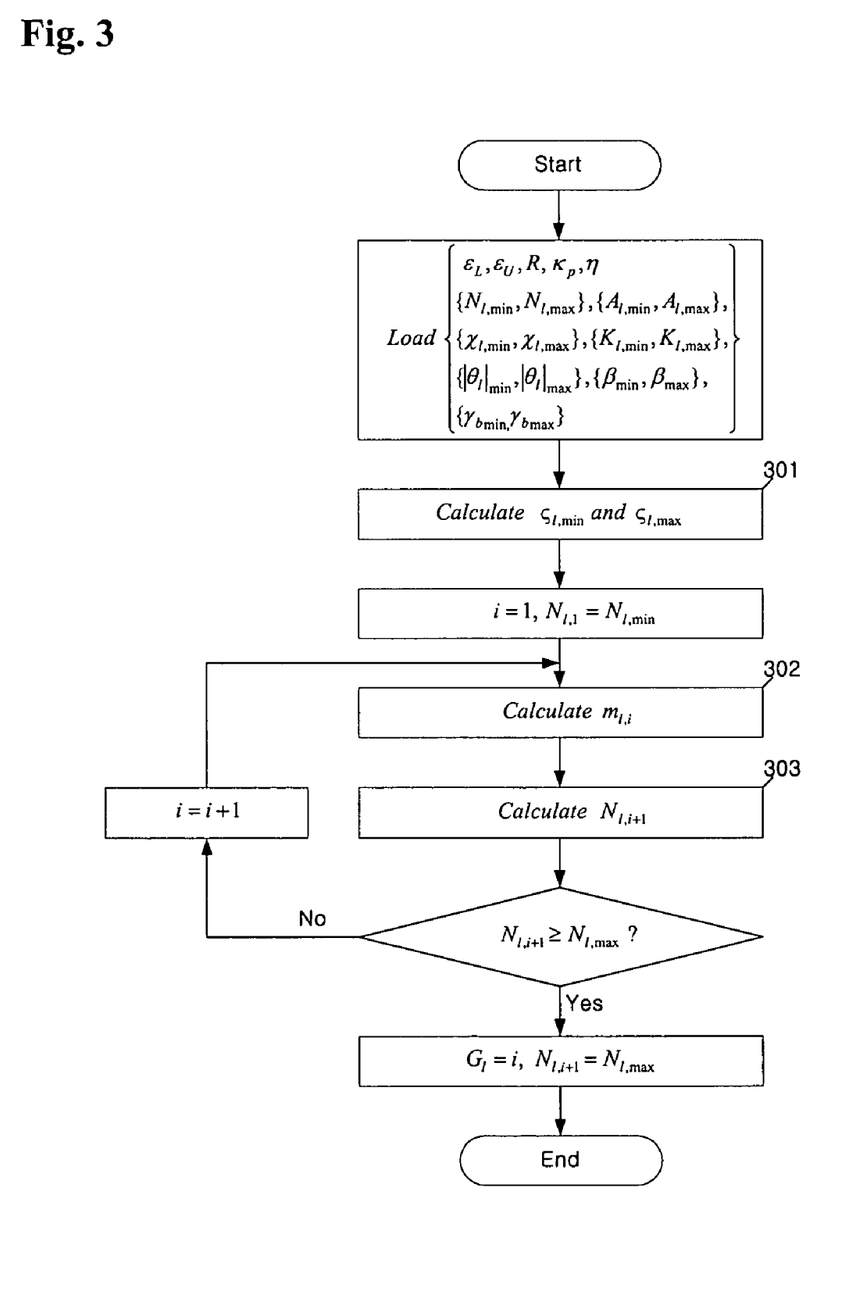
FIG. 3 represents design procedure that the CEC performs.
Figure 4:
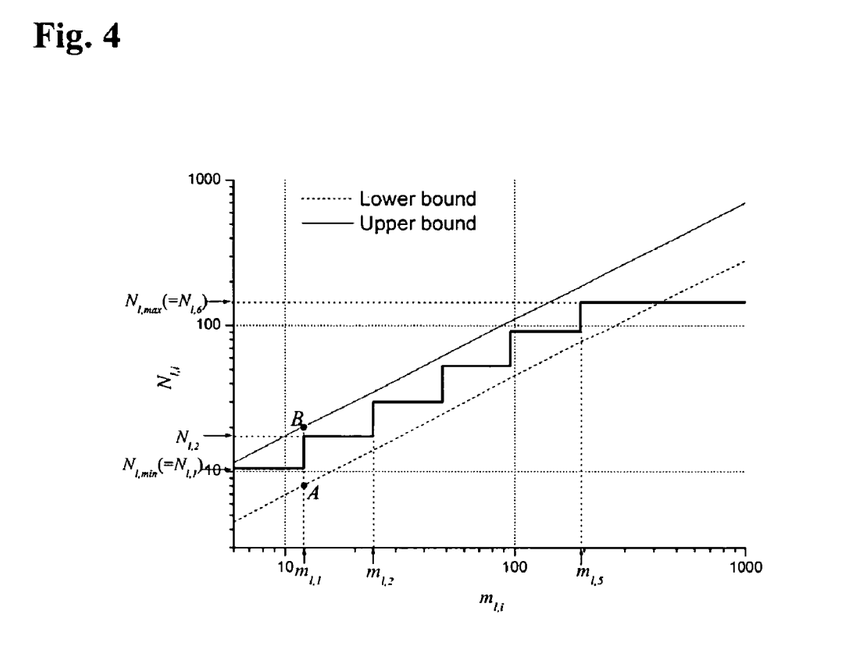
FIG. 4 depicts an example of parameter decision of the CEC.

The design procedure of the CPE 101 is depicted in FIG. 3, where the internal variables $\zeta_{l,min}$ and $\zeta_{l,max}$ used for steps 302 and 303 can be calculated in step 301 using Eq. [1] and [2].

$$\zeta_{1,min} = \frac{y_{min} - \sqrt{y_{min}^2 - 4x_{min}z_{min}}}{2x_{min}} \qquad \text{Eq. [1]}$$

where $x_{min} = K_{l,max} \cos^4 |\theta_l|_{min} / 24 + 1/64$ $y_{min} = K_{l,max} \cos^2 |\theta_l|_{min} / 2 + 1/4$ $z_{min} = (1 - \eta)(1 + K_{l,max}) - \frac{\eta A_{l,max}(1 + K_{l,max})}{R\beta_{min}^2 \kappa_p \gamma_{bmin}}$ where Here, the subscripts max and min respectively denote the maximum and minimum values of the parameter.

$$\zeta_{1,min} = \frac{y_{max} - \sqrt{y_{max}^2 - 4x_{max}z_{max}}}{2x_{max}} \qquad \text{Eq. [2]}$$

where $x_{max} = K_{l,min} \cos^4 |\theta_l|_{max} / 24 + 1/120$ $y_{max} = K_{l,min} \cos^2 |\theta_l|_{max} / 2 + 1/6$ $z_{max} = (1 - \eta)(1 + K_{l,min}) - \frac{\eta A_{l,min}(1 + K_{l,min})}{R\beta_{max}^2 \kappa_p \gamma_{bmax}}$ where The tap size of the first CEF, $N_{l,1}$, is set to the minimum tap size $N_{l,min}$. Then, using the lower bound margin $\epsilon_L$, the amount of delay $m_{l,1}$ of the first correlator 502 can be determined in step 302 using Eq. [3] with i=1 such that the point A in FIG. 4 is represented as $(m_{l,1},(1+\epsilon_L)^{-1}N_{l,1})$.

$$m_{l,i} = 0.5 \left[ \frac{((1+\epsilon_L)^{-1} N_{l,i})^5 R \gamma_{bmax} \zeta_{l,max}^2}{A_{l,min}(1 + K_{l,min})} \cdot \frac{\beta_{max}^2(K_{l,min} \cos^4 |\theta_l|_{max} / 9 + 1/\chi_{l,max})}{} \right] \qquad \text{Eq. [3]}$$

Using an upper boundary margin $\epsilon_U$ and $m_{l,1}$, the tap size $N_{l,2}$ of the second CEF in the l-th finger can be calculated such that $(m_{l,1},(1+\epsilon_U)N_{l,2})$ is on the upper boundary (say, the point B in FIG. 4 for i=1). Thus, $N_{l,2}$ can be determined in step 303 using Eq. [4] with i=1, $$N_{l,i+1} = \qquad \text{Eq. [4]}$$

$$\frac{1}{1+\epsilon_U}\left(\frac{16 A_{l,max} m_{l,i}^4 (1 + K_{l,max})}{R\gamma_{bmin}\beta_{min}^2 \zeta_{l,min}^2 (K_{l,max}\cos^4|\theta_l|_{min} / 9 + 1/\chi_{l,min})}\right)^{1/5}$$

Similarly, $m_{l,2}$ can be calculated using $N_{l,2}$ and Eq.[3] with i=2. In this way, $m_{l,i}$, i=1, 2, . . . , $G_l$, and $N_{l,i}$, i=1, 2, . . . , $G_l$+1, can be calculated iteratively until the tap size becomes larger than or equal to the predetermined maximum value $N_{l,max}$. When $N_{l,i+1} \geq N_{l,max}$, $G_l$ and $N_{l,i+1}$ are set to a value of i and $N_{l,max}$, respectively.

FIG. 4 illustrates a design example of the parameters for the CPE 101, where the upper bound is determined by the values of $A_{l,min}$, $\chi X_{l,min}$, $K_{l,max}$, $|\theta_l|_{min}$, $\beta_{min}$ and $\gamma_{bmin}$ and the lower bound by the values of $A_{l,max}$, $\chi_{l,min}$, $K_{l,min}$, $|\theta_l|_{max}$, $\beta_{max}$ and $\gamma_{bmax}$. For example, when $N_{l,min}$=11, $N_{l,max}$=150, $A_{l,min}$=1, $A_{l,max}$=6, $\chi_{l,min}$=24, $\chi_{l,max}$=45, $K_{l,min}$=0, $K_{l,max}$=∞, $|\theta_l|_{min}$=0, $|\theta_l|_{max}$=90°, $\beta_{min}$=$\beta_{max}$=¼, $\gamma_{bmin}$=3 dB, $\gamma_{bmax}$=10 dB, $\epsilon_L$=$\epsilon_U$=0.3, R=½, $\kappa_p$=12 and $\eta$=0.3, the value of $G_l$ is determined to 5. Then, the values of $m_{l,i}$ and $N_{l,i}$, i=1, 2, . . . , 5 obtained by the procedure shown in FIG. 3, are $m_l$={12, 24, 48, 96, 192}, $N_l$={11, 17, 30, 53, 91, 145}.

Figure 5:
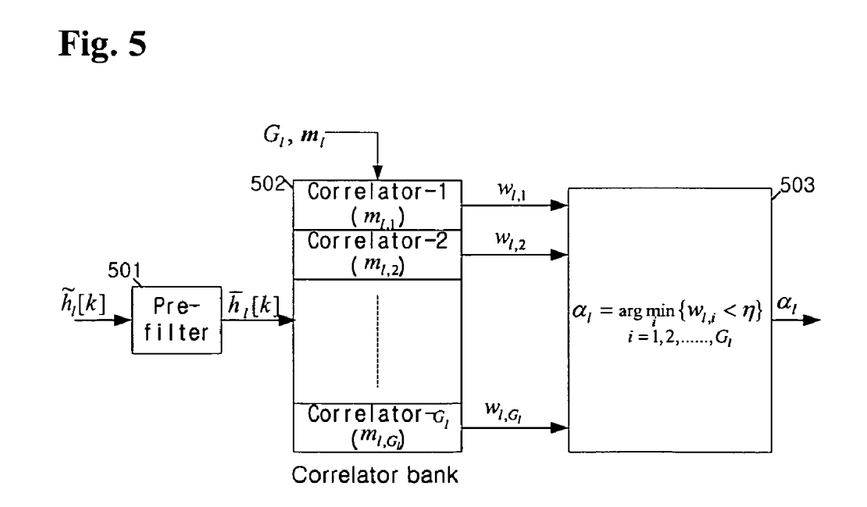
FIG. 5 is the channel parameter estimator (CPE) of FIG. 1.

FIG. 5 depicts the structure of the CPE 101 of FIG. 1. The received pilot symbol $\tilde{h}_l[k]$ is first lowpass filtered by the prefilter 501 to reduce the noise. A conventional lowpass filter including an MA FIR filter or a simple IIR filter can be used as the prefilter 501. The prefiltered pilot symbol $\bar{h}_l[k]$ is input to the correlator bank 502 which comprises $G_l$ correlators, where the number $G_l$ is determined by the CEC 102.

Figure 6:
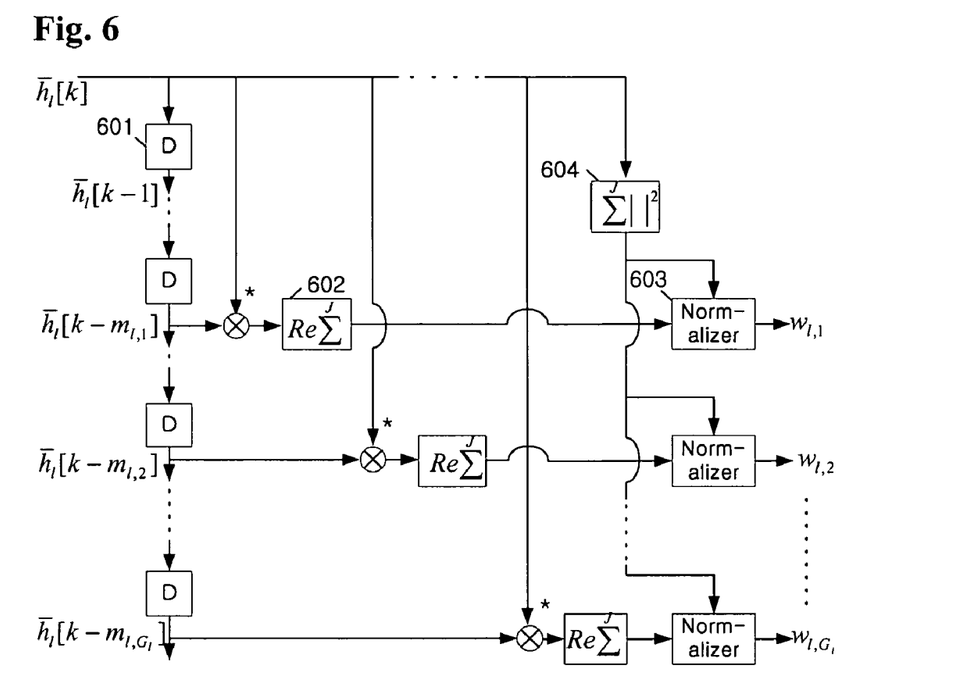
FIG. 6 represents the structure of correlator bank in the CPE.

The detail block diagram of the correlator bank 502 is depicted in FIG. 6. In the i-th correlator, the filtered pilot symbol $\bar{h}_l[k]$ is correlated with the $m_{l,i}$ symbol delayed pilot signal $\bar{h}_l[k-m_{l,i}]$ using the accumulator 602 for an interval of J symbols. The output of the correlator is normalized by the module 603 by using Eq. [5]. Since the values of $m_{l,i}$ are determined in the CEC 102 such that $m_{l,i} < m_{l,i+1}$, i=1, 2, ..., $G_l$−1, the correlator output $w_{l,i}$ fast decreases as i increases.

$$w_{l,i} \equiv \frac{\sum_J \mathrm{Re}\{\bar{h}_l^*[n]\bar{h}_l[n-m_i]\}}{\sum_J |\bar{h}_l[n]|^2} \quad \text{Eq. [5]}$$

The outputs of correlators, $w_{l,1}, w_{l,2}, \ldots,$ and $w_{l,G_l}$, are sequentially compared with a given threshold $\eta$ by the comparator 503. The comparator 503 finds out which correlator output is less than $\eta$ for the first time by increasing the correlator index number i from i=1 to $G_l$. If the j-th correlator output becomes less than $\eta$ for the first time, $\alpha_l$ is set to j, $1 \leq j \leq G_l$. When there is no correlator output less than $\eta$, $\alpha_l$ is set to a value of $G_l$+1.

Figure 7:
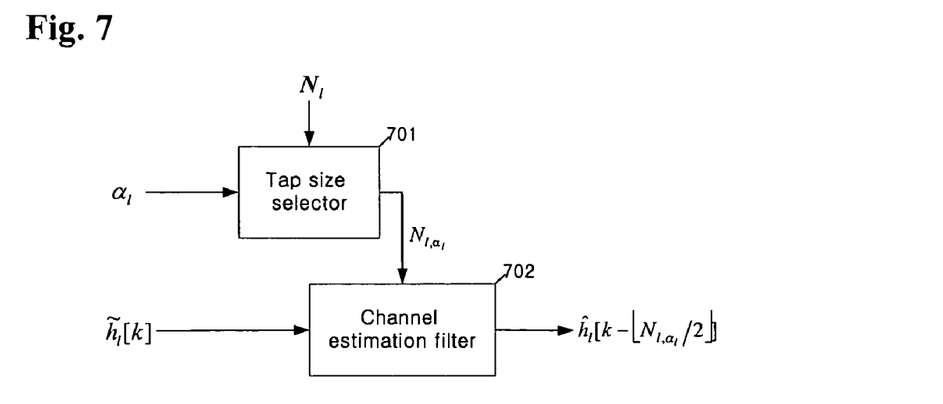
FIG. 7 is the channel estimation filter module of FIG. 1.

FIG. 7 depicts the structure of the CEF module 103. The tap size selector 701 determines the tap size $N_{l,\alpha_l}$ according to the output $\alpha_l$ of the CPE 101 among the values of $N_{l,i}$, i=1, 2, ..., $G_l$+1. The structure of the CEF is depicted in FIG. 8 when an MA FIR filter is used as the CEF. A maximum number, $N_{l,max}$, of the pilot symbols $\bar{h}_l[k]$, are sequentially stored in the register 801. If $N_{l,\alpha_l}$ is chosen by the tap size selector 701, the contents of the leftmost $N_{l,\alpha_l}$ registers in the register 801 are added by the adder 802 and then averaged by the averaging module 803, yielding the channel information as Eq. [6].

$$\hat{h}_l[k - \lfloor N_{l,\alpha_l}/2 \rfloor] = \frac{1}{N_{l,\alpha_l}} \sum_{i=0}^{N_{l,\alpha_l}-1} \tilde{h}_l[k-i] \quad \text{Eq. [6]}$$

where $\lfloor x \rfloor$ denotes an integer k such that $k \leq x \leq k+1$. In this case, the output of the delay element 109 is delayed by $\lfloor N_{l,\alpha_l}/2 \rfloor$ symbols.

The structure of the CEF is depicted in FIG. 9 when general FIR filters are used as the CEF. FIR filters are designed such that they have a cut-off frequency similar to that of an $N_{l,\alpha_l}$-tap MA FIR filter, $\alpha_l$=1, 2, ... and $G_l$+1. The coefficients $\{\alpha_{l,i}\}$ are selected among ($G_l$+1) coefficient sets of designed FIR filters. The number $N'_{l,max}$ is the largest tap size of the designed FIR filter corresponding to an equivalent $N_{l,max}$-tap MA CEF. Finally, the channel information is obtained by adding the received pilot symbols weighted by coefficients $\{\alpha_{l,i}\}$ as Eq. [7].

$$\hat{h}_l[k - \lfloor N'_{l,\alpha_l}/2 \rfloor] = \sum_{i=0}^{N'_{l,\alpha_l}-1} \alpha_{l,i} \tilde{h}_l[k-i] \quad \text{Eq. [7]}$$

When the tap size of the designed FIR filter corresponding to an $N_{l,\alpha_l}$-tap MA FIR filter is $N'_{l,\alpha_l}$, the output of the delay element 109 is delayed by $\lfloor N'_{l,\alpha_l}/2 \rfloor$ symbols.

The structure of the CEF is depicted in FIG. 10 when IIR filters are used as the CEF. These IIR filters are designed such that they have a cut-off frequency similar to that of an $N_{l,\alpha_l}$-tap MA filter, $\alpha_l$=1, 2, ... and $G_l$+1. The coefficients $\{\alpha_{l,i}\}$ and $\{\beta_{l,i}\}$ are selected among the coefficient sets of the designed IIR filters. The channel information is obtained by passing the despread pilot symbol into the selected IIR filter as Eq. [8]. The output of the delay element 109 is delayed by $N_{l,IIR}$ symbols considering the group delay of the selected IIF CEF.

$$\hat{h}_l[k - N_{l,IIR}] = \sum_{i=0}^{N'_{l,\alpha_l}-1} \alpha_{l,i} \tilde{h}_l[k-i] + \sum_{i=0}^{N'_{l,\alpha_l}-1} \beta_{l,i} \hat{h}_l[k - N_{l,IIR} - i] \quad \text{Eq. [8]}$$

The structure of the CEF is depicted in FIG. 11 when a single-pole IIR filter is used as the CEF. The forgetting factor $\alpha_{l,IIR}$ is set to $(N_{l,\alpha_l}/2-1)/(N_{l,\alpha_l}/2)$ when $N_{l,\alpha_l}$ is chosen by the tap size selector 701. The channel information is obtained using Eq. [9]. The output of the delay element 109 is delayed by $\lfloor N_{l,\alpha_l}/2 \rfloor$ symbols.

$$\hat{h}_l[k - \lfloor N_{l,\alpha_l}/2 \rfloor] = (1 - \alpha_{l,IIR})\tilde{h}_l[k] + \alpha_{l,IIR}\hat{h}_l[k - \lfloor N_{l,\alpha_l}/2 \rfloor - 1] \quad \text{Eq. [9]}$$

What is claimed is:

1. A receiver employing an adaptive channel estimator including multipliers, accumulators and delay elements, said adaptive channel estimator comprising:
    a channel estimation filter (CEF) for obtaining a channel impulse response by filtering a pilot symbol;
    a channel parameter estimator (CPE) for classifying the channel type using said pilot symbol and selecting the CEF according to the classified channel type;
    a channel estimation controller (CEC) for determining internal parameters of the CPE and the CEF based on a channel environment and an operating condition;
    wherein said pilot symbol is obtained from multiplying a received pilot signal of at least one path by known sequence in at least one of said multipliers and accumulating by at least one of said accumulators, and said impulse response of said CEF is adaptively adjusted accordingly to outputs of the CPE and CEC.

2. The receiver according to claim 1, wherein said channel type is classified using a correlator bank having multiple correlators.

3. The receiver according to claim 1, wherein said channel type is classified using autocorrelation properties of the received pilot signal.

4. The receiver according to claim 2, wherein said correlator bank employs a pre-filter to effectively suppress noise in the received pilot signal for improvement of the channel type classification.

5. The receiver according to claim 1, wherein said channel type classification is determined if a parameter set of a minimum and maximum tap size of the CEF, a total received signal to each path received signal power ratio, a Ricean factor of the channel, an incident angle of a direct ray, a pilot to data signal power ratio, and a received signal to noise power ratio per bit is given.

6. The receiver according to claim 5, wherein parameters of the CEF are adaptively adjusted according to the channel type and the operating condition.

7. The receiver according to claim 5, wherein said tap size of the CEF is a tap size of a moving average finite impulse response (FIR) filter, said tap size of said moving average FIR filter is determined as the tap size of said CEF according to channel parameters including at least one of the total received signal to each path received signal power ratio, the Ricean factor of the channel, the incident angle of the direct ray, the pilot to data signal power ratio, and the received signal to noise power ratio per bit.

8. The receiver according to claim 5, wherein said CEF is a single-pole infinite impulse response (IIR) filter, where a coefficient of said single-pole IIR filter is determined as the coefficient of said CEF according to channel parameters including at least one of the total received signal to each path received signal power ratio, the Ricean factor of the channel, the incident angle of the direct ray, the pilot to data signal power ratio, and the received signal to noise power ratio per bit.

9. The receiver according to claim 5, wherein a cut-off frequency of the CEF is determined according to channel parameters including at least one of the total received signal to each path received signal power ratio, the Ricean factor of the channel, the incident angle of the direct ray, the pilot to data signal power ratio, and the received signal to noise power ratio per bit.

* * * * *